United States Patent [19]
Yeh et al.

[11] Patent Number: 5,003,426
[45] Date of Patent: Mar. 26, 1991

[54] FAULTED CURRENT INDICATORS AND INRUSH RESTRAINTS THEREFOR

[75] Inventors: Thomas Yeh, South Weymouth; Joseph R. Thibodeau, Dedham, both of Mass.

[73] Assignee: Sigma Instruments, Inc., Weymouth, Mass.

[21] Appl. No.: 374,216

[22] Filed: Jun. 30, 1989

Related U.S. Application Data

[63] Continuation-in-part of Ser. No. 362,063, Jun. 6, 1989, abandoned.

[51] Int. Cl.⁵ .............................................. H02H 3/08
[52] U.S. Cl. ........................................ 361/59; 361/96
[58] Field of Search ...................... 361/59, 89, 93, 74, 361/95, 96, 92; 340/664

[56] References Cited

U.S. PATENT DOCUMENTS 3,715,742  3/1988  Schweitzer, Jr. ............... 361/59 X
4,733,321  2/1973  Lindeperg ........................ 361/96

Primary Examiner—Derek S. Jennings
Attorney, Agent, or Firm—Stanger, Michaelson, Spivak & Wallace

[57] ABSTRACT

A faulted circuit indicator includes an inrush restraint circuit that suppresses a trip signal when an inrush current rises from below a minimum value to a trip value within a predetermined time and then drops again to another value such as the trip value. According to various aspects the restraint ends after a fixed time or after a variable time. According to another aspect a second trip circuit overrides the inrush restraint circuit when the current rises a given amount beyond the first trip value.

20 Claims, 9 Drawing Sheets

FAULTED CURRENT INDICATORS AND INRUSH RESTRAINTS THEREFOR

RELATED APPLICATIONS

This application is a continuation-in-part of the application of Thomas Yeh and Joseph R. Thibodeau, Ser. No. 362,063, filed June 6, 1989, and is related to the copending application of Joseph R. Thibodeau and Matthew Dillon, Ser. No. 303,761, filed June 30, 1989, both assigned to the assignee of this application.

BACKGROUND OF THE INVENTION

This invention relates to faulted current indicators, and particularly to methods and means for displaying a faulted current condition while ignoring high inrush restraints.

Faulted current indicators (or FCI's or fault indicators) are placed at intervals along power lines or cables to decrease the time of locating faults, either temporary or permanent, on utility distribution systems. In general, each FCI is a high current trip and low current reset indicating device that displays whether a fault has occurred between the indicator and a load. Such devices often respond unintentionally to energization inrush currents and therefore provide inaccurate information.

Attempts to disregard energization inrush currents have had limited success because they required extended outages for operation and were unable to ignore long term inrushes.

OBJECTS AND SUMMARY OF THE INVENTION

An object of the invention is to overcome these difficulties.

Another object of the invention is to furnish reliable inrush restraints for faulted circuit indicators.

Another object of the invention is to provide methods and means for indicating faulted circuits while ignoring various types of inrushes.

According to a feature of the invention, we achieve such objects with faulted circuit indicating method and means by disabling the FCI's trip circuit in response to currents in the cable changing from below a first value to above a second value within a predetermined time and falling again below the second value.

According to another feature of the invention, the trip means is disabled for a second time period overlapping the predetermined time.

According to another feature of the invention, the trip means is disabled from within the first period of time to the time the current falls again below the second value.

These and other features of the invention are pointed out in the claims. Other objects and advantages of the invention will become evident from the following detailed description of preferred embodiments of the invention when read in light of the following drawings.

DETAILED DESCRIPTION OF PREFERRED EMBODIMENTS

Figure 1:
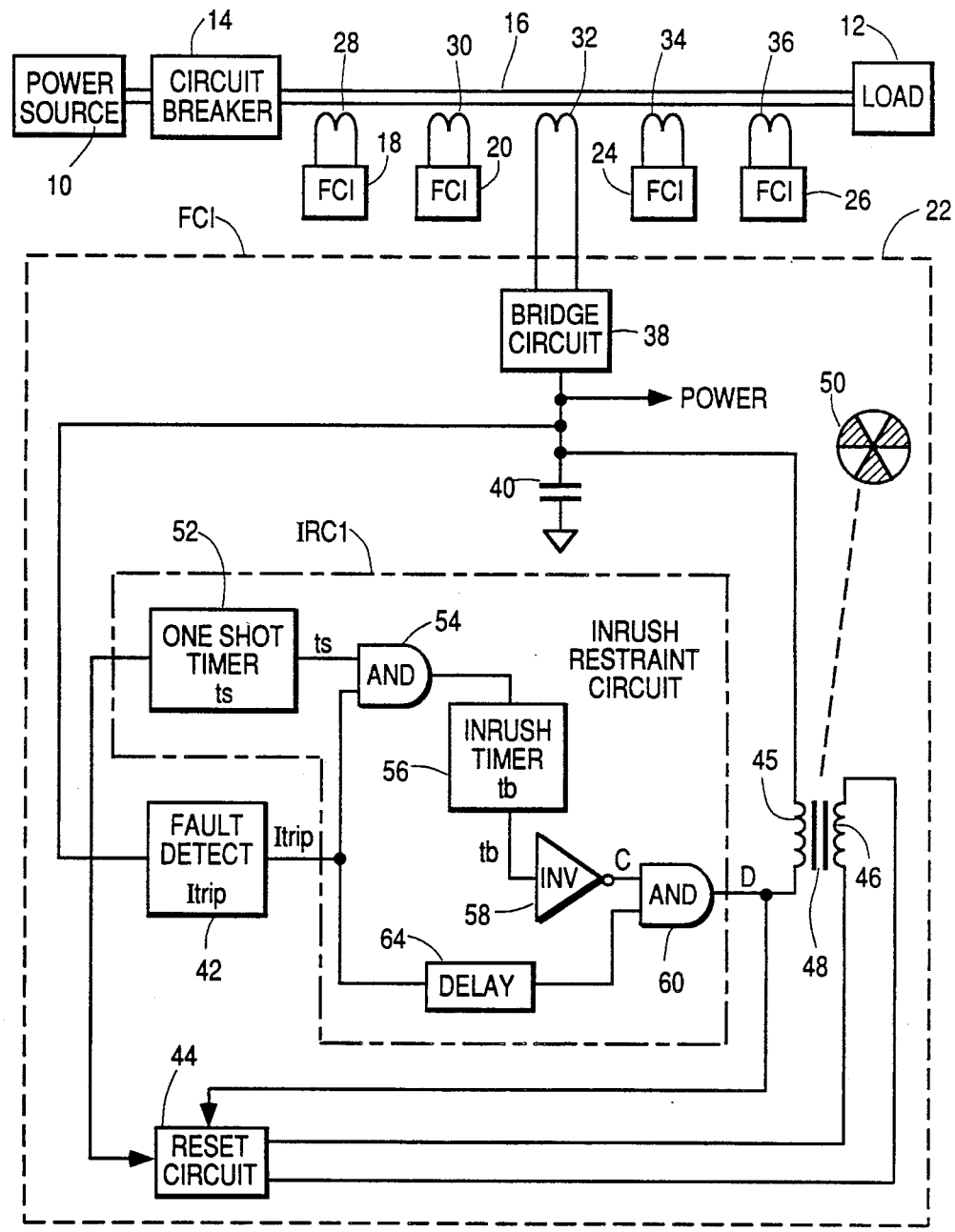
FIG. 1 is a block diagram illustrating an embodiment of the invention.

FIG. 1 illustrates the invention and its environment. In FIG. 1 a power source 10 energizes a load 12 through a circuit breaker 14 and a power cable 16. Faulted circuit indicators (FCI's) 18, 20, 22, 24, and 26, inductively coupled to the cable 16 by inductive sensors 28, 30, 32, 34, and 36 at spaced locations along the cable, sense whether a fault exits at positions between any FCI's. A fault between FCI 24 and FCI 26 causes high current to trip FCI's 18 to 24 while leaving FCI 26 reset. This identifies the location of the fault as being between FCI 24 and FCI 26. The length of the cable 16 appears shortened for purposes of illustration. Although only FCI 22 is shown in detail, it will be understood that the other FCI's are identical thereto.

The inductive sensors 28 to 36 produce respective alternating voltages corresponding in amplitude to the amplitude of the alternating currents they sense in the cable 16. In the FCI 22, a bridge circuit 38 rectifies the sensed alternating voltage to form a direct current waveform and a capacitor 40 captures the peak value of the rectified voltage. The voltage across the capacitor is now proportional to the current flowing in the power cable 16. A trip circuit 42 and a reset circuit 44 operate on the basis of the voltage across the capacitor 40. The trip circuit 42 is set to produce a trip signal when the voltage across the capacitor 40 exceeds a trip voltage Vtrip to indicate that the current in the cable 16 is beyond a trip current Itrip The inductive sensor 32, the bridge circuit 38 and the capacitor 40 together serve the dual role of providing the signal proportional to current in the power cable 16 and of furnishing the energy necessary to operate the electronic circuits of the FCI. According to another embodiment of the invention, a reed switch place in the electromagnetic field of the power cable 16 gives an indication of excess current and an inductive current sensor, bridge, and capacitor supply the necessary energy. According to still another embodiment, other energy sources such as a battery replace the current sensor, bridge, and capacitor combination.

The reset circuit 44 produces a reset signal in response to a minimum potential across the capacitor 40, Vmin corresponding to a minimum current Imin in the cable 16. The reset signal energizes a reset winding 46 of an electromagnetic fault display activator 48 and drives a target 50 into a reset position. At the same time, a one-shot timer 52 reacts to the minimum voltage Vmin and goes high for a predetermined trip test period ts. This enables an AND gate 54 for the period ts. If during the time ts the voltage across capacitor 40 reaches the trip voltage Vtrip to which the trip circuit 42 is set, the latter applies a high on the other input to the AND gate 54. The AND gate 54 then actuates a one-shot inrush timer 56 which produces a high signal for an inrush test period tb. An inverter 58 applies a low to a trip disabling AND gate 60 during the inrush test period tb. This prevents the trip circuit 42 from passing a high to a trip winding 62 on the fault display activator 48 and from turning the target 50 to the trip position during the inrush test period tb.

A delay circuit 64 between the trip circuit 42 and the AND gate delays the signal from the trip circuit 42 to the AND gate 60 just long enough to allow the signal from circuit 42 through AND gate 54 and timer 56 as well as inverter 58 to turn off the AND gate 60. The delay 64 need not be a separate circuit element, but may an inherent capacitive or other delaying effect in the input of the AND gate 60 or the output of the circuit 42.

The timer 52, AND gate 54, timer 56, inverter 58, AND gate 60, and delay 64 form an inrush restraint circuit IRC1. The restraint circuit IRC1 inhibits trip operation during inrush.

Under steady conditions, the inverter 58 applies a high to the AND gate 60. During an ordinary fault the trip circuit 42 produces a high which the delay circuit 64 applies to the AND gate 60. This energizes the trip winding 62 which turns the target 50 to the trip position. The target 50 remains in the trip position until a reset signal returns it to the reset position.

During trip operation, a high appears at the output of AND gate 60. This high inhibits the reset circuit 44 and prevents it from energizing the reset winding 46 until the high ends and a new signal at capacitor 40 reenergizes the reset circuit. When the circuit breaker 14 turns off the power to the cable 16 in response to a fault, the target 50 remains in the trip position until the breaker allows reenergization of cable 16 and the reset circuit 44.

The trip circuit 42 and the reset circuit 44 are well known. Examples of the details of such circuits appear in the aforementioned copending application of J. Thibodeau, Ser. No. 303,761, filed Mar. 30, 1989 and assigned to the same assignee as this application, and in U.S. Pat. No. 3,715,742.

Figure 2:
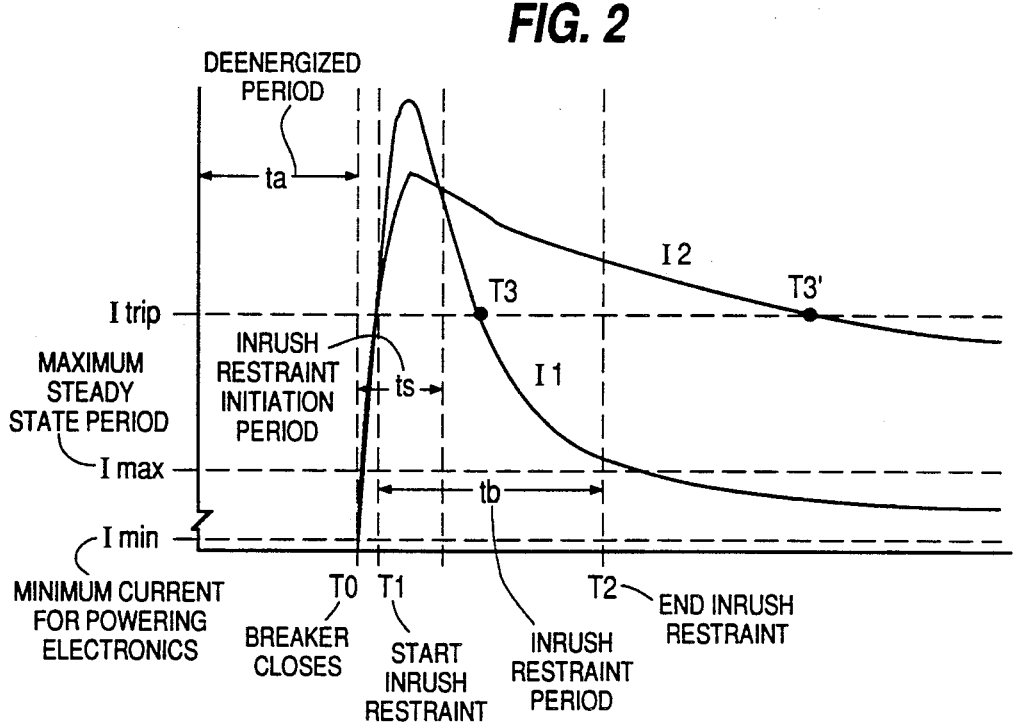
FIG. 2 is a graph illustrating the operation of the circuit in FIG. 1.

The graph of FIG. 2 illustrates the operation of FIG. 1. Here, the abscissa represents time and the ordinate represents current. The voltages Vmin, Vmax, and Vtrip across capacitor 40 are proportional to the currents Imin, Imax, and Itrip shown in FIG. 2. The current Imin symbolizes the minimum current in cable 16 for allowing the sensor 22, the bridge 38, and the capacitor 40 to deliver enough energy to operate the electronic components of FCI 22. The current Imax expresses the maximum steady state line current as determined by the connected load 12, and the current Itrip the trip setting of the fault indicator as selected by the user.

FIG. 2 depicts two types of inrush currents which can occur simultaneously and are additive. Energization inrush current I1 results from energization current, such as magnetization of transformers and initial charge current of capacitors. Energization inrush current I1 decays rapidly to a steady state value. The other type is cold-load inrush current I2 which arises from cold loads drawing excessive current until such time that the loads heat up and current decays to the steady state value. Cold-load inrush current I2 depends upon the duration of the de-energized period and usually lasts longer than the energization inrush current I1.

As shown in FIG. 2, inrush currents I1 and/or I2 start at a time To after a de-energized period ts when the breaker 14 closes to permit current flow. As soon as the current reaches the value Imin, sufficient to power the circuits in FCI 22, the one-shot timer 52 goes high for the trip test period ts. Shortly thereafter, before the current ascends to the value I trip, the reset circuit 44 triggers the winding 46 and rotates the target 50 to the reset position.

If the current rises slowly enough so it does not constitute an inrush, it will not reach the trip value Itrip within the period ts. The AND gate 54 then stays low and keeps the inrush timer 56 low. The inverter 58 now enables one input of the AND gate 60 by keeping it high. Hence, any current reaching the trip value after the period ts turns on the circuit 42, prompts the enabled AND gate 60 to go high through the delay 64, and excites the trip winding 62 of the display activator 48. Hence the FCI 22 drives the target 50 to trip position normally in the absence of a current rise rapid enough to be considered an inrush current.

If the current reaches the trip value Itrip within the period ts, namely while the one-shot timer 52 is high, the high at the trip circuit 42 forces the AND gate 54 to go high. The resulting high at the inrush timer 56 and the low at the inverter 58 turn off the AND gate 60 for a time period tb. If, during the time period tb, the current decays quickly, such as shown by the curve of the energization current I1, and drops below the value Itrip the AND gate 60 remains low and keeps the trip winding 62 un-energized. This keeps the fault target 50 of the fault display activator 48 in the reset state. That is the inrush restraint feature of the circuit in FIG. 2 disables the trip circuit. The delay 62 delays the signal from the trip circuit 42 to the AND gate 60 just long enough to allow the same signal through members 54, 56, and 58 to the AND gate.

On the other hand, if the current follows the cold inrush current curve I2, and does not fall below the trip current Itrip within the time tb, the AND gate 60 goes high after the time tb and excites the trip winding 62 so as to turn the target 50 to the trip condition. The inrush restraint then fails to disable the trip circuit 42. If the trip signal arises from a fault in the cable 16, the breaker 14 opens. When the breaker recloses the reset circuit 44 excites reset winding 62 and turns the target 50 to its reset position.

Figure 3:
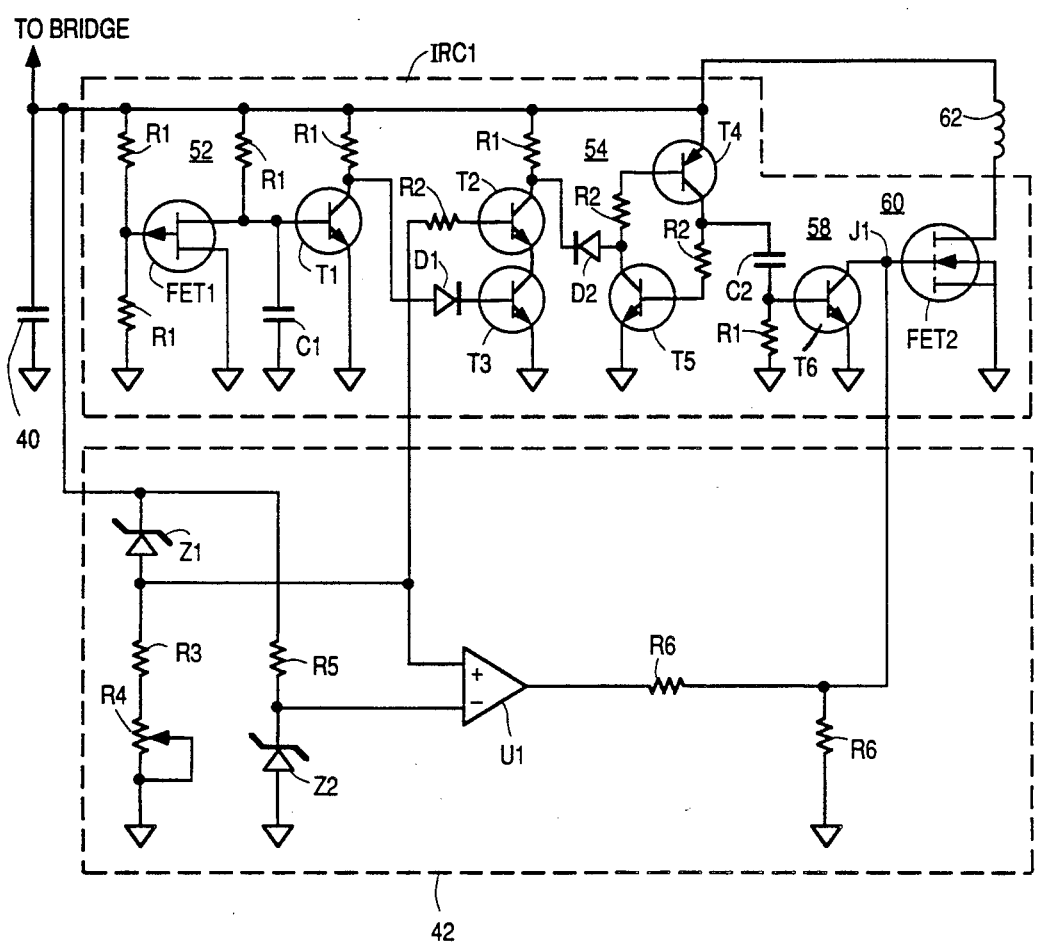
FIG. 3 is a circuit diagram illustrating details of part of the circuitry in FIG. 1.

FIG. 3 illustrates details of the inrush restraint circuit IRC1 and the trip circuit 42. In the inrush restraint circuit IRC1 the one-shot timer 52 is composed of a P channel junction field effect transistor FET1 and a transistor T1 powered by the voltage across the capacitor 40 through biasing resistors R1 and coupled by a shunt capacitor C1. A characteristic of a P channel junction field effect transistor such as field effect transistor FET1 is that it exhibits a low impedance between drain and source when its gatesource voltage is zero. The impedance increases when the gate-voltage rises. Hence, before the current in the cable 16 reaches Imin, the voltage of the gate of field effect transistor FET1 remains sufficiently low to cause field effect transistor FET1 to discharge capacitor C1 and/or prevent it from charging.

When the current reaches Imin and the capacitor 40 energizes the circuit IRC2, the low across capacitor C1 turns off transistor T1 and produce a high at its output to start the time ts. The current reaching Imin also raises the gate voltage at field effect transistor FET1 and allows capacitor C1 to charge through the biasing resistor R1. When the voltage across capacitor C1 goes sufficiently high, the transistor T1 turns on, its collector goes low, and the period ts ends.

The AND gate 54 includes two series connected NPN transists T2 and T3. The transistor T2 receives an input from the trip circuit 42 through an input resistor R2, while a diode D1 applies the output of the transistor T1 to the transistor T3. Both transistors T2 and T3 must be on simultaneously for the voltage at transistor T2 to go low.

The inrush timer 56 includes a PNP transistor T4 and an NPN transistor T5 which serve to latch the output of the transistor T2, as well as a timing capacitor C2 and a timing resistor RT which set the time tb. The inverter 58 is composed of a transistor T6. Together with a field effect transistor FET2, a junction J1 constitutes an AND gate 60. The junction J1 and field effect transistor FET2 receive one input from the transistor T6 and the other input from the circuit 42.

Under steady state conditions, the transistor T2 remains un-energized by a trip signal and stays high. This turns off PNP transistor T4. The off transistor T4 prevents charging of the capacitor C2. Hence, during steady state, the resistor RT biases the transistor T6 off so that the junction J1 can go high. The field effect transistor FET2 can then pass a trip current to winding 62 in response to a high from trip circuit 42.

If during the time ts, a trip signal appears at the base of transistor T2, the latter goes low and turns on transistor T4. This starts the operation of the inrush timer 56 and the period tb. The on PNP transistor T4 raises the voltage of its collector. The transistor T5 feeds back the high collector voltage of transistor T4 to latch transistor T4 in its on condition regardless of changes in the output of the transistor T2. The diode D2 now prevents the high at transistor T2 from turning off transistor T4. The high at the collector of transistor T4 drives the base of transistor T6 high and turns it on. This lowers the voltage at the junction J1 and turns off the AND gate represented by the junction J1 and field effect transistor FET2. The field effect transistor FET1 then will not pass a trip current to the winding 62.

The capacitor C2, in response to the high at the collector of transistor T4 begins charging through the on transistor T4 and the resistor RT. The initial charge current through resistor RT maintains a high at the base of transistor T6 and keeps it on until the charge current decreases and the voltage across the resistor RT drops enough to turn off the transistor T6. The low at the base of transistor T6 defines the end of the inrush period tb.

As stated, the field effect transistor FET2 and the junction J1 constitute the AND gate 60. The junction J1 and field effect transistor FET2 receive one input from the transistor T6 and the other input from the circuit 42. If either input is low, field effect transistor FET2 turns off and prevents current from passing to the trip-winding 62. Both inputs to the junction J1 and field effect transistor FET2 must be high to turn on field effect transistor FET2 and provide current to the trip-winding 62.

The circuit 42 includes a first zener diode Z1 with series resistor R3 and adjustable series resistor R4. The connection between the zener diode Z1 and the resistor R3 establishes a trip voltage when the voltage across capacitor 40 reaches a value corresponding to Itrip. The resistor R4 adjusts the trip value in the range between 20 and 30 volts on capacitor 40.

A second zener diode having a much lower value than the trip value, a series resistor R5, and a comparator U1 as well as a voltage divider composed of series resistors R6 sharpen the trip signal and apply it to the junction J1 which forms the AND gate 60.

The gate terminal of field effect transistor FET2 exhibits a high capacitance. This capacitance tends to delay a rising voltage but not a descending voltage. During an inrush current, the capacitance from the gate of field effect transistor FET2 to ground has the effect of delaying the rising trip signal from the trip circuit 42 without delaying the descending inrush restraint signal from the inverting transistor T6 of inverter 58. Accordingly, the inrush restraint override affects the field effect transistor FET2 earlier than the trip signal from comparator U1.

Figure 4:
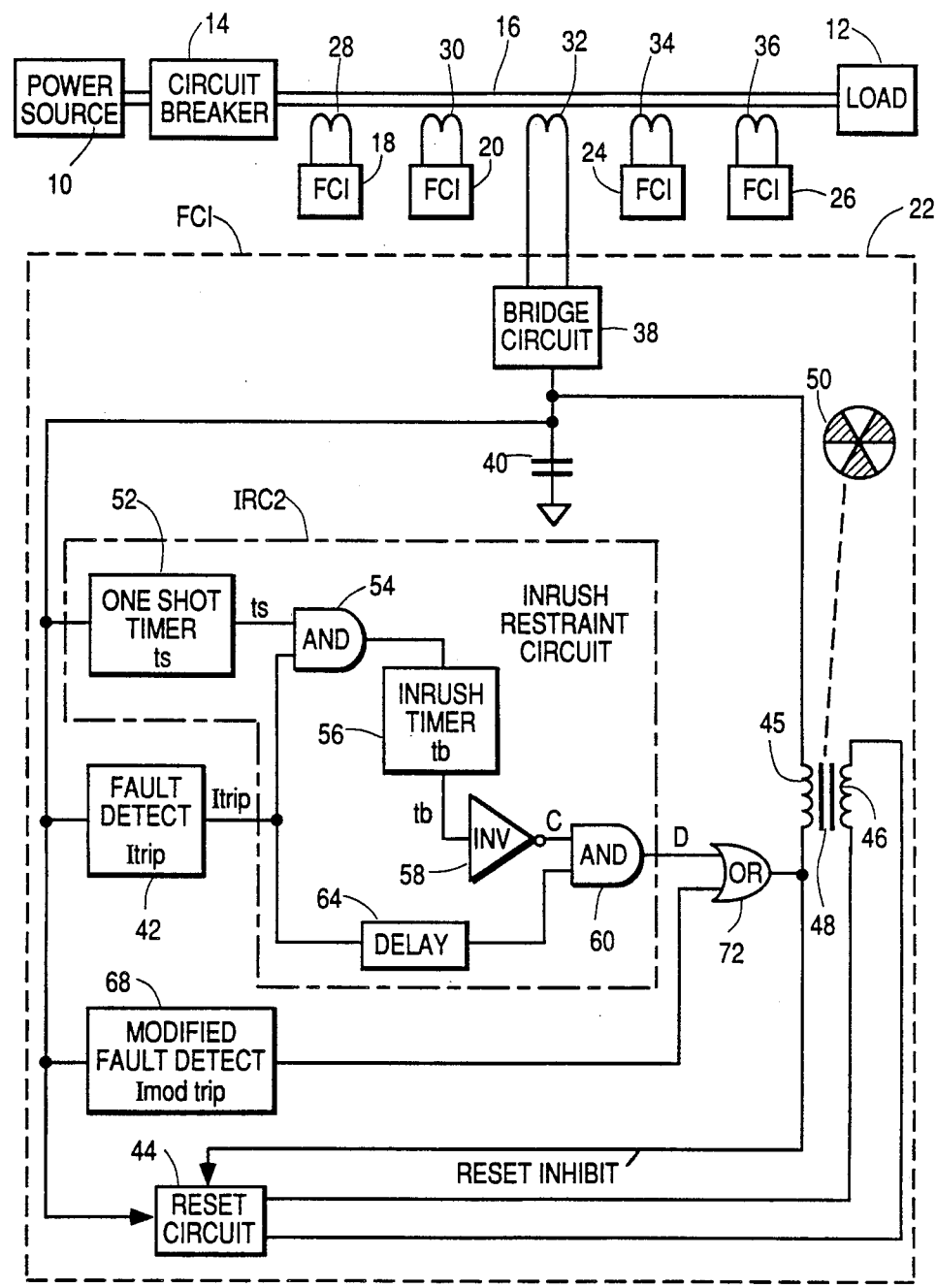
FIG. 4 is a block diagram illustrating another embodiment of the invention.

FIG. 4 illustrates another embodiment of the invention shown in FIG. 1. Here, reference numerals 10 to 62 represent the same parts shown in FIG. 1. The circuit in FIG. 4 differs from the circuit in FIG. 1 in that a modified fault circuit 68 overrides the effect of the inrush restraint circuit IRC1. The circuit 68 does this by applying a trip signal to the winding 62 through an OR gate 72 during the time tb if the voltage across the capacitor 40 exceeds a modified trip value Vtrip mod, corresponding to a cable current Itrip mod substantially higher than the trip value Vtrip in the fault circuit 42 corresponding to the cable current Itrip. The OR gate 72 also passes a high signal on the AND gate 60 to the winding 62 as in FIG. 1. Hence, the winding 62 receives a trip signal either when the inrush timer 56, and inverter 58 do not inhibit a signal from the fault circuit 42, or when, during the time period tb, the voltage across capacitor 40 exceeds the modified trip value Vtrip mod sensed at the modified fault circuit 68.

Figure 5:
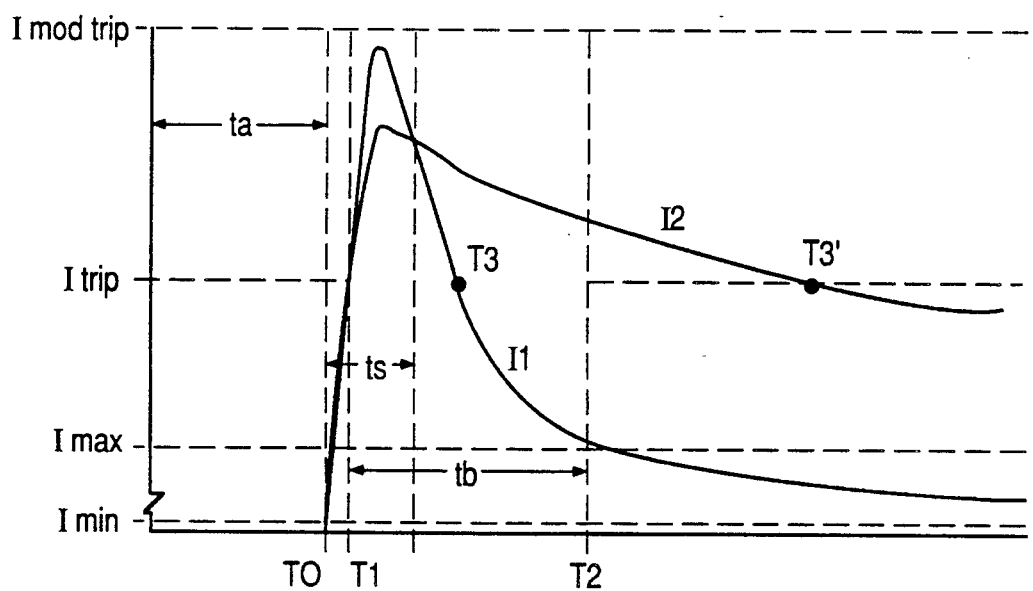
FIG. 5 is a graph illustrating the operation of the circuit in FIG. 4.

This arrangement allows changing of the target 50 and the fault indicator 48 to a trip position by modifying the trip setting of the fault indicator to a greater value after the initiation of the restraint which inhibits the output of the fault circuit 42. The value of the modified trip setting Vtrip mod in the modified fault circuit 68 is chosen so only a true fault during inrush could generate such a magnitude. Since the modified fault circuit 68 circumvents the inrush restraint circuit RC1 during the inhibited state of the AND gate 60 this arrangement captures a fault during the restraint period when the magnitude of the fault exceeds the modified trip setting. This embodiment works well with recloser operations of the circuit breaker 14 because the duration of the recloser sequences do not allow the load 12 to "cool down" significantly. During recloser sequences the types of inrushes illustrated in FIG. 5 as I2 do not occur. FIG. 5 depicts the operation of the circuit in FIG. 4.

As shown in FIGS. 4 and 5 the period ts starts when the line current reaches Imin to power the circuit within the fault indicator 22. The inrush restraint circuit IRC1 remains disarmed if, during the period ts the current fails to exceed the trip setting of the fault circuit 42.

During the restraint period tb, the modified fault circuit 68 and the OR gate 72 shift the trip operation to a higher level determined by the modified fault circuit 68 to accommodate inrush currents. FIG. 5 shows the modified preset trip setting Itrip mod as twice that of the steady state trip setting fault circuit 42. In addition, the steady state trip setting Itrip is for example three times that of the maximum steady state line current Imax. Therefore, during the inrush restraint period, the trip setting is six times that of the maximum steady state line current. If inrush current does not exceed the value Itrip mod, and the inrush restraint circuit IRC1 blocks a trip signal from trip circuit 42, the target 50 will stay in its reset state during the time tb.

The user of the device may change the modified trip setting Itrip mod to any value higher than the steady state trip setting Imax, and the period of restraint tb could also be varied as required by a user.

During steady state operation, the reset circuit 44 energizes the reset winding 46 and turns the target 50 to its reset position. At the same time the inverter 58 "opens" AND gate 60 by keeping one input high. Hence a normal fault current above the value Itrip causes the trip circuit 42 to pass a high through delay 64 and AND gate 60. The high causes OR gate 72 to energize the trip winding 62 which turns the target 50 to the trip position. The fault also actuates the circuit breaker 14.

After the circuit breaker 14 recloses, the one-shot timer 52 goes high when the current in the cable 16 reaches Imin and provides sufficient energy to operate the fault indicator. The signal of the output of AND gate 54 remains low throughout the period ts unless the fault circuit 42 goes high. A high at circuit 42 causes the inrush restraint timer to go high and initiate the period tb. During the period tb when the timer 56 output is high, the inverter 58 goes low. The AND gate 60 then goes low regardless of the Itrip signal status. Once the period tb passes, the output of inverter 64 goes high and allows the output of AND gate 60 to follow the Itrip output of fault circuit 42. When the current flowing through the power cable 16 exceeds the trip setting of fault circuit 42, the latter furnishes a high trip signal and the output of AND gate 60 follows this high state to furnish the trip signal to the display activator 48.

During the period tb when the output of inrush timer 56 is high, and when the fault circuit 42 signal is preventing the trip operation of the display activator 48, the modified fault circuit 68 drives the trip display activator 48 if the current flowing in the power cable 16 exceeds the modified trip setting Itrip mod of modified fault circuit 68. Therefore, during the restraint period when the voltage at an input of AND gate 60 is low, fault display activator 48 receives a trip signal Itrip mod established by the modified fault circuit 68. During steady state operation the fault indicator will trip either in response to the circuit 42 or circuit 68. However, during the steady state, because the circuit 42 responds to value much less than that of the circuit 68, the display activator 48 will respond once the voltage of the capacitor 40 exceeds the setting of fault circuit 42.

Figure 6:
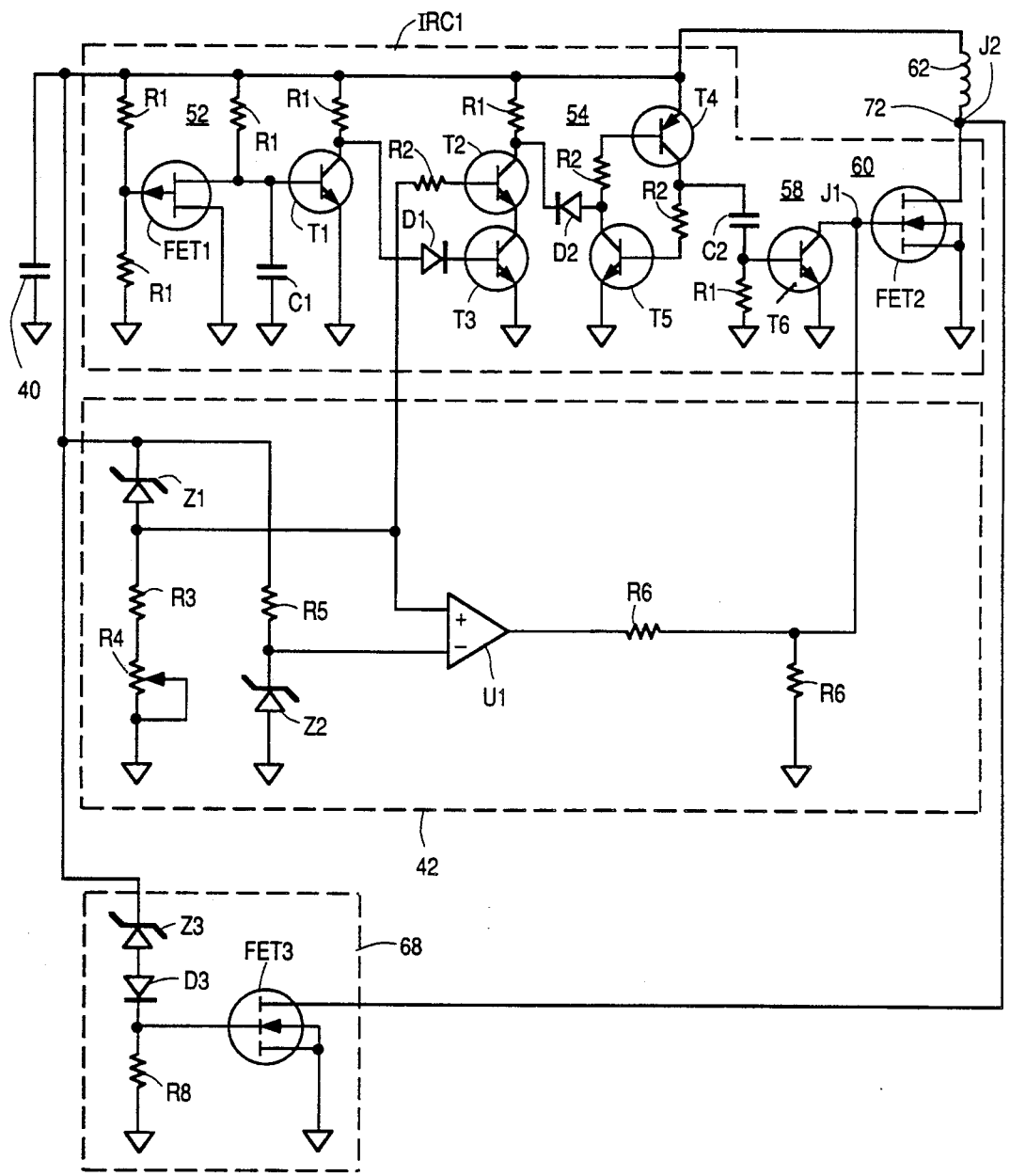
FIG. 6 is a circuit diagram illustrating details of part of the circuitry in FIG. 4.

FIG. 6 illustrates details of the inrush restraint circuit IRC1, fault circuit 42, and modified fault circuit 68. The circuit if FIG. 6 differs from the circuit in FIG. 3 in the existence of the modified fault circuit 68 and the OR gate 72. In the modified fault circuit 68, a zener Z3, a diode D3, and a resistor R8 form a trip circuit with a field effect transistor FET 4. The values of the zener Z3, diode D3, and resistor R8 are chosen to produce trip at a value twice that of the circuit 42. The field effect transistor FET 3 produces a sharp signal capable of energizing the winding 62. The junction J2 forms an OR gate in that a high at either field effect transistor FET 3 or field effect transistor FET2 is capable of producing a trip current through the winding 46.

Figure 7:
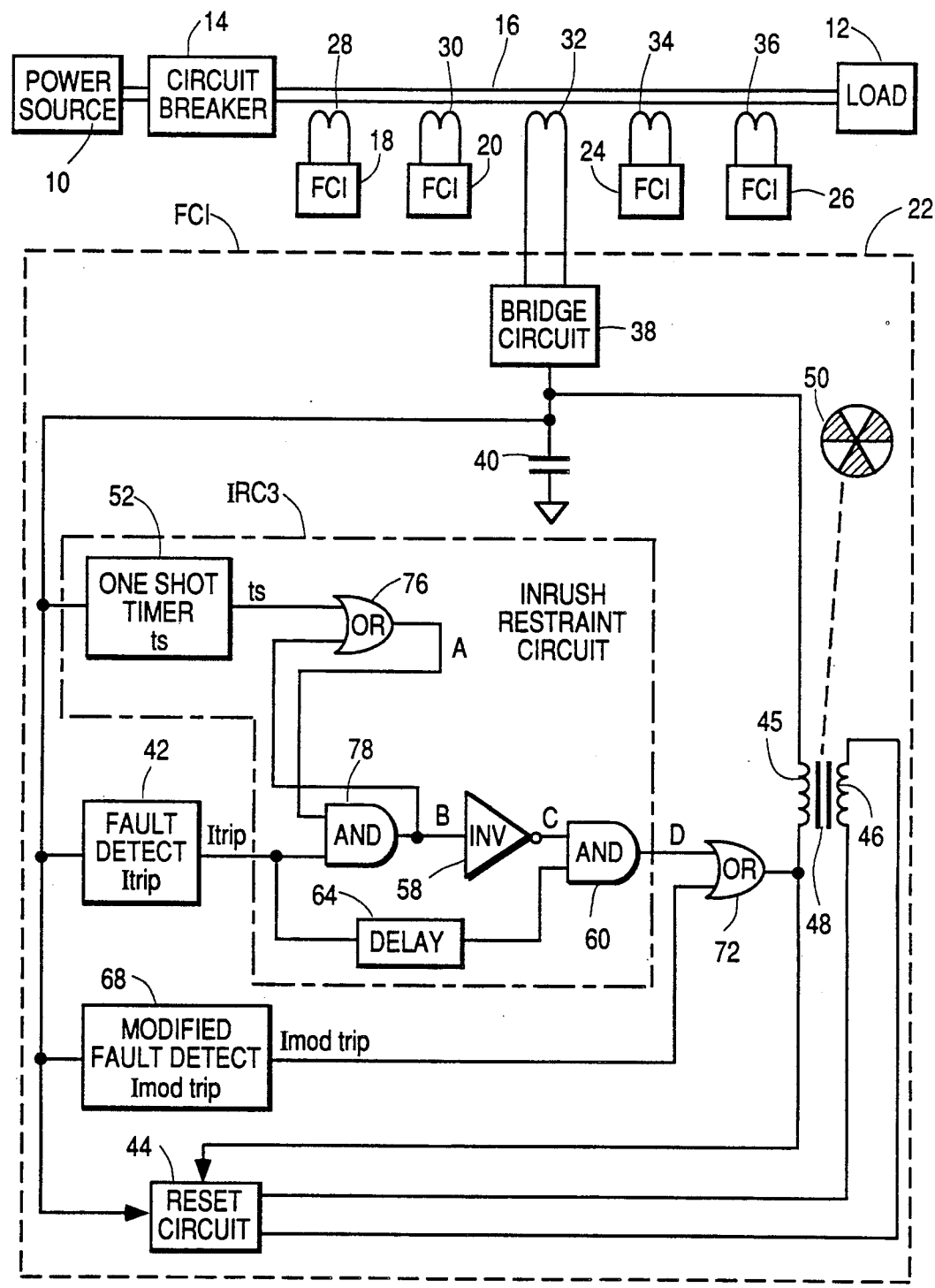
FIG. 7 is a block diagram illustrating another embodiment of the invention.

FIG. 7 illustrates yet another embodiment of the invention. Here, member 10 to 52 and 58 to 72 correspond to those members carrying like reference characters in FIG. 4. The circuit in FIG. 7 differs from the circuit in FIG. 4 in that the time period tb' following the period ts varies and lasts as long as the inrush current, i.e., until the current drops below the value Itrip. For this purpose, an inrush restrain circuit IRC2 includes an OR gate 76 which produces a signal A that follows the status of the signals ts from the one-shot timer 52. This biases one side of an AND gate 78. If within the time period ts, the fault circuit 42 goes high and responds to the capacitor 40, the signal B at the output of AND gate 78 goes high. This output passes through the OR gate 76 and keeps the AND gate 78 high even after the end of the signal from the one-shot timer 52. The inverter 58 takes the output of the high signal at B and applies it at C as a low inhibiting signal to the input of the AND gate 60. This restrains an Itrip signal from the fault circuit 42 through the delay 62 and prevents the latter from affecting the display activator 48. The restraint mode lasts until the signal Itrip at the output of fault circuit 42 goes low thereby turning the output of AND gate 78 at B to a low. Once the period tb has lapsed, the low at output of AND gate 78 causes the signal A to become low and thereby cause the inverter 58 to bias the AND gate 60 on in response to any future trip signals from the fault circuit 42.

The restraint mode during which the AND gate 60 is inhibited lasts until the output of the fault circuit 42 drops below the trip value Vtrip corresponding to the current Itrip. Accordingly, no trip signal passes from the AND gate 60 during this restraint mode. The restraint period lasts as long as the initial high period of the fault circuit 42. The restraint period ends when the initial high signal at fault circuit 42 returns to low and releases the AND gate 78.

On the other hand, even during the restraint mode the modified fault circuit 68 can override the effect of AND gate 58. The OR gate 72 allows the winding 62 of fault display activator 48 to drive the target 50 to a trip condition when the modified fault circuit 68 receives a signal from the capacitor 40 that the cable 16 has current which exceeds the trip setting of the modified fault circuit 68. The signal from the fault circuit 68 then passes through the OR gate 72 to the winding 62.

Figure 8:
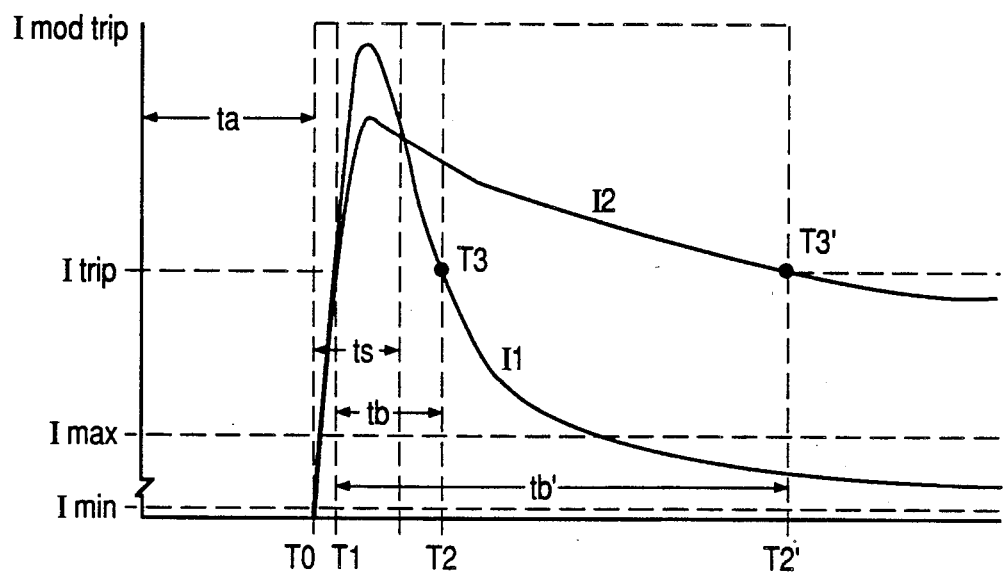
FIG. 8 is a graph illustrating the operation of the circuit in FIG. 7.

The operation of the circuit in FIG. 7 appears in FIG. 8. The arrangement prevents tripping of fault indicators on inrush current by modifying the trip setting Itrip of the fault indicator 42 with a higher trip setting Itrip mod at circuit 68 during the restraint period established by the voltage at C. The restraint period lasts from when the time the one-shot circuit 52 initiates period ts to the time the current I1 of I2 in FIG. 8 decays below the trip setting Itrip established by the fault circuit 42.

Put differently, the restraint period lasts as long as the inrush current. This arrangement thus prevents tripping of the display activator 48 by both I1 and I2 types of inrush. Because the OR gate 72 bypasses the disabling effect of the AND gate 60 during the time tb, this arrangement captures a fault during the restraint period if the magnitude of the fault exceeds that set by the modified fault circuit 68.

The period ts starts when the line current reaches a value Imin sufficient to power the circuits within the faulted current indicators. The inrush restraint circuit 76, 78, 58, 60 remains disarmed during this period if the current in the cable 16 is insufficient to cause a voltage at capacitor 40 sufficient to produce an output at the fault circuit 42.

As can be seen in FIG. 8, the period of restraint tb varies with the amount of time the inrush current stays above the trip setting of the circuit 68. This appears as period tb extended to tb. The inrush restraint period finishes for current I1 at T2 and for current I2 at T2'.

During the restraint period tb and tb', the modified fault circuit 68, AND gate 70, and OR gate 72 modify the trip operation to any desired higher level above the value set by the fault circuit 42 to accommodate the inrush currents. FIG. 8 shows the preset modified trip setting of fault circuit 68 to be twice that of the steady state trip setting of fault circuit 42. In addition, the steady state trip setting is three times that of the maximum steady state line current. Therefore, during the inrush restraint period, the trip setting is six times that of the maximum steady state line current.

The ratio of the modified trip setting of modified fault circuit 68 to that of the fault circuit 42 is only an example and may be changed as desired by users.

Figure 9:
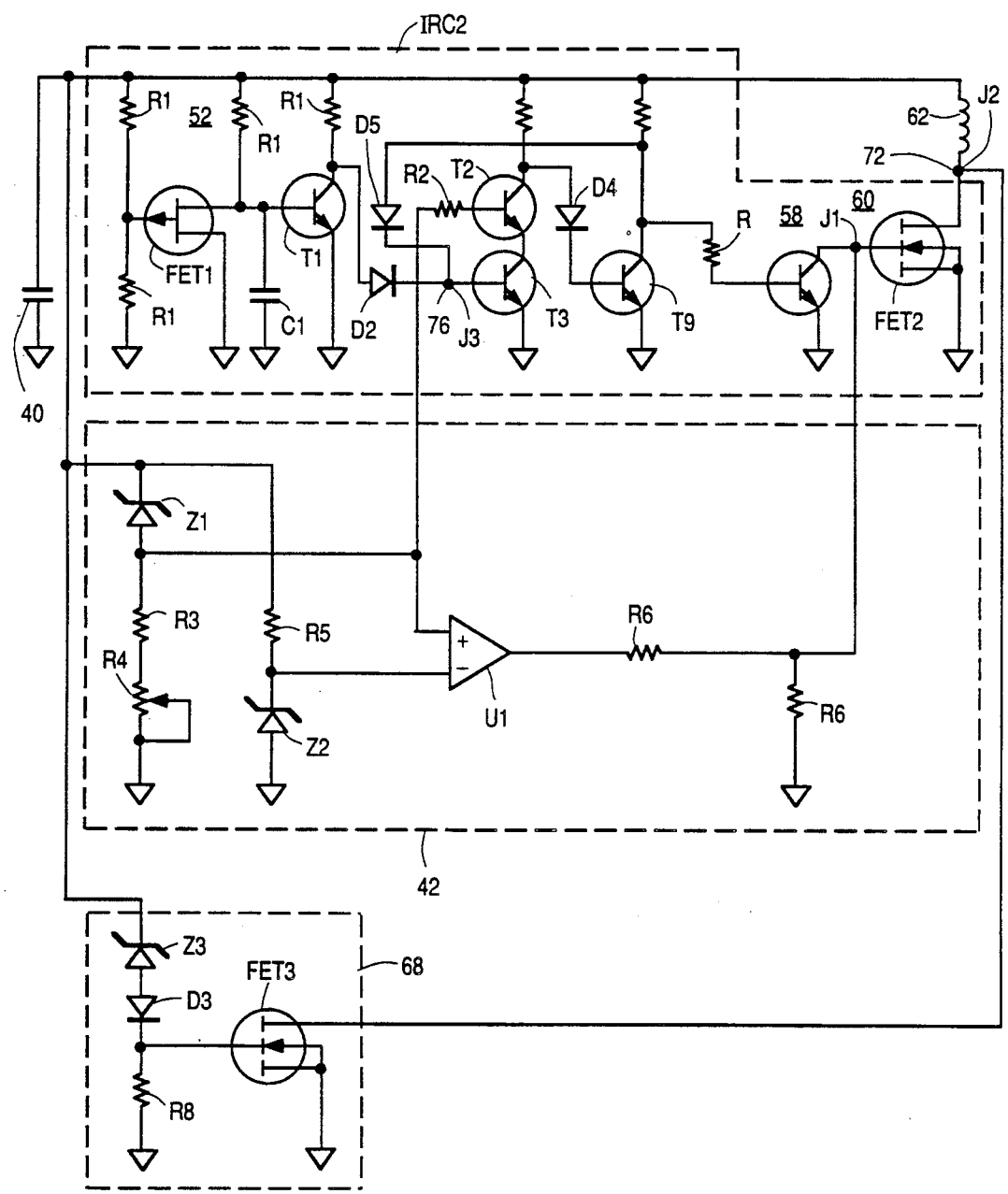
FIG. 9 is a circuit diagram illustrating details of part of the circuitry in FIG. 7.

The circuit of FIG. 9 illustrates details of the inrush restraint circuit IRC2, the fault circuit 42, and the modified fault circuit 68. The circuit in FIG. 9 differs from the circuit in FIG. 6 in that transistor T9 and resistor R9 of FIG. 9 replace transistors T4 and T5, capacitors C2, and their associated resistors. Also, a diode D4 replaces the diode D2 and a feedback diode D5 connects the collector of transistor T9 to the base of transistor T3.

In FIG. 9, the diode D2 at the output of the one-shot timer 52 at the transistor T1 forms a junction J3 with the feed back diode D5. The diodes D3 and D5 and junction J3 form the OR gate 76 which feeds one input of the AND gate 78 at the base of transistor T3. The AND gate 78 includes the transistors T2 and T3 from the AND gate 54 but also includes a inverting transistor T9 which is coupled to the collector of the transistor T2 by the diode D4. The feedback diode D5 applies the output of the transistor T9 to the junction J3 of the OR gate 76. This circuit operates in accordance with the principles set out with respect to FIGS. 7 and 8.

In summary, the following symbols are used in FIGS. 2, 5, and 8:

Imax: Maximum steady state line current (determined by connected load).
Itrip: Trip setting of the fault indicator (Selected by user).
Imod trip: Modified trip setting of the fault indicator (selected by user).
Imin: Minimum line current required to power the internal circuit of the fault indicator (less than or equal to reset operate current).
T0: Time at which the breaker 14 is closed.
T1: Time at which inrush restraint period is started.
T2: Time at which inrush restraint period is finished.
T3: Time at which the inrush drops below the trip setting.
ta: Elapse time of the de-energized period.
tb: Duration of the inrush restraint period.
ts: Duration at start-up which an overcurrent will initiate the restraint circuit. An overcurrent outside this period will cause a trip operation if the fault indicator was not in the restraint mode.
I1: Inrush current caused by energization current, such as magnetization of transformers and initial charge current of capacitors. This type of inrush decays rapidly to steady state value.
I2: Inrush current caused by cold loads drawing excessive current until such time that the loads heat up and current decays to the steady state value. This type of inrush depends on the duration of the de-energized period and usually lasts longer than the I1 type of inrush.

I1 and I2 are additive.

The circuit IRC1 and IRC2 exhibit an energy saving advantage in that under steady state and other conditions only a few of the transistors are on.

While embodiments of the invention have been described in detail, it will be evident to those skilled in the art that the invention may be embodied otherwise.

What is claimed is:

1. A faulted circuit indicator, comprising:
reset means responsive to a first current value in a cable for producing a reset signal;
trip means responsive to a second current value higher than the first value for producing a trip signal;
disabling means coupled to said trip means for producing a signal to disable said trip means in response to current in the cable changing from below the first value to above the second value within a predetermined period and falling again below the second value.

2. An indicator as in claim 1, wherein:
said disabling means is arranged for responding to the currents in the cable falling below the second value within a fixed period overlapping the predetermined period.

3. An indicator as in claim 1, wherein:
said trip means is further responsive to a third value of current in the cable higher than the second value for producing a trip signal despite any action by said disabling means.

4. An indicator as in claim 1, wherein:
said disabling means is arranged to produce a signal for disabling said trip means in response to currents in the cable within a variable period overlapping the predetermined period and ending when the current in the cable falls below the second value.

5. An indicator as in claim 1, wherein:
said disabling means is arranged to produce a signal for disabling said trip means in response to currents in the cable within a variable period overlapping the predetermined period and ending when the current in the cable falls below the second value, and said trip means is further responsive to a third value of current in the cable higher than the second value for producing a trip signal despite any action by said disabling means.

6. An indicator as in claim 1, wherein said disabling means includes:
a first timer for producing a first timing signal for the first period;
determining means for determining that the values of current in the cable exceed the second value during the first period and producing a determining signal;
a second timer for producing a fixed second timing signal for a second timing period in response to the determining signal;
inhibit means for inhibiting a trip signal from said trip means in response to said second timer during the second timing period.

7. An indicator as in claim 1, wherein said disabling means includes:
a first timer for producing a first timing signal for the first period;
determining means for determining that the values of current in the cable exceed the second value during the first period and producing a determining signal;

a second timer for producing a fixed second timing signal for a second timing period in response to the determining signal;

inhibit means for inhibiting a trip signal from said trip means in response to said second timer during the second timing period;

said trip means is further responsive to a third value of current in the cable higher than the second value for producing a trip signal despite any action by said disabling means.

8. An indicator as in claim 1, wherein said disabling means includes:

a first timer for producing a first timing signal for the first period;

determining means for determining that the values of current in the cable exceed the second value during the first period and producing a determining signal;

timing extension means responsive to said first timer for extending the period of said first timer to the time the current in the cable falls below the second value.

inhibit means for inhibiting a trip signal from said trip means in response to said extension means during the extended time.

9. An indicator as in claim 1, wherein said disabling means includes:

a first timer for producing a first timing signal for the first period;

determining means for determining that the values of current in the cable exceed the second value during the first period and producing a determining signal;

timing extension means responsive to said first timer for extending the period of said first timer to the time the current in the cable falls below the second value;

inhibit means for inhibiting a trip signal from said trip means in response to said extension means during the extended time;

said trip means is further responsive to a third value of current in the cable higher than the second value for producing a trip signal despite any action by said disabling means.

10. An indicator as in claim 1, wherein:

said disabling means is arranged to produce a signal for disabling said trip means in response to currents in the cable within a variable period overlapping the predetermined period and ending when the current in the cable falls below another value higher than the first value.

11. A method of indicating ordinary conditions and faults in a power cable in the presence of inrush currents, which comprises:

resetting an indicator in response to a first current value in the cable so as to produce a reset signal indicative of ordinary conditions;

producing a trip signal in response to a second current value higher than the first value;

disabling the trip signal in response to current in the cable changing from below the first value to above the second value within a predetermined period and falling again below the second value.

12. A method as in claim 11, wherein:

the disabling step responds to the currents in the cable reading the second value within a fixed period overlapping the predetermined period.

13. A method as in claim 11, wherein the step of producing a trip signal involves responding to a third value of current in the cable higher than the second value for producing a trip signal despite the disabling of the trip signal.

14. A method as in claim 11, wherein:

the disabling step includes producing a signal for disabling the trip signal in response to currents in the cable within a variable period overlapping the predetermined period and ending when the current in the cable falls below the second value.

15. A method as in claim 11, wherein:

the disabling step includes producing a signal for disabling the trip signal in response to currents in the cable within a variable period overlapping the predetermined period and ending when the current in the cable falls below the second value; and the step of producing the trip signal involves responding to a third value of current in the cable higher than the second value for producing a trip signal despite the disabling step.

16. A method as in claim 11, wherein the disabling step includes:

producing a first timing signal for the first period;

determining that the values of current in the cable exceed the second value during the first timing period and producing a determining signal;

producing a fixed second timing signal for a second timing period in response to the determining signal;

inhibiting a trip signal during the second timing period.

17. A method as in claim 11, wherein the disabling step includes:

producing a first timing signal for the first period;

determining that the values of current in the cable exceed the second value during the first timing period and producing a determining signal;

producing a fixed second timing signal for a second timing period in response to the determining signal;

producing a signal to inhibit a trip signal during the second timing period;

responding to a third value of current in the cable higher than the second value for producing a trip signal despite the disabling step.

18. A method as in claim 11, wherein said disabling step includes:

producing a first timing signal for the first period;

determining that the values of current in the cable exceed the second value during the first period and producing a determining signal;

extending the first timing period to the time the current in the cable falls below the second value; and inhibiting a trip signal during the extended time.

19. A method as in claim 11, wherein said disabling step includes:

producing a first timing signal for the first period;

determining that the values of current in the cable exceed the second value during the first period and producing a determining signal;

extending the first timing period to the time the current in the cable falls below the second value;

inhibiting a trip signal during the extended time; and responding to a third value of current in the cable higher than the second value and producing a trip signal despite action of said disabling step.

20. A method as in claim 11, wherein:

the disabling step includes producing a signal for disabling the trip signal in response to currents in the cable within a variable period overlapping the predetermined period and ending when the current in the cable falls below another value higher than the first value.

* * * * *